United States Patent
Petuchowski (12)

(10) Patent No.: US 11,050,975 B1
(45) Date of Patent: Jun. 29, 2021

(54) RECIPROCAL SIGNALING OF PARTICIPANT GAZE IN MULTIPOINT VIDEO CONFERENCING

(71) Applicant: Samuel J. Petuchowski, Brookline, MA (US)

(72) Inventor: Samuel J. Petuchowski, Brookline, MA (US)

(*) Notice: Subject to any disclaimer, the term of this patent is extended or adjusted under 35 U.S.C. 154(b) by 0 days.

(21) Appl. No.: 17/038,987

(22) Filed: Sep. 30, 2020

Related U.S. Application Data

(60) Provisional application No. 63/054,740, filed on Jul. 21, 2020.

(51) Int. Cl.
*H04N 7/15* (2006.01)
*H04N 5/445* (2011.01)
*G06T 7/70* (2017.01)

(52) U.S. Cl.
CPC ............... *H04N 7/15* (2013.01); *G06T 7/70* (2017.01); *H04N 5/445* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 8,581,956 B2* | 11/2013 | Robinson | H04L 65/1096 348/14.06 |
| 8,717,406 B2 | 5/2014 | Garcia et al. | |
| 8,947,493 B2 | 2/2015 | Lian et al. | |
| 9,438,819 B2 | 9/2016 | Van Broeck | |
| 10,348,454 B2 | 7/2019 | Liu et al. | |
| 2014/0168056 A1* | 6/2014 | Swaminathan | G06F 3/147 345/156 |
| 2015/0074556 A1* | 3/2015 | Bader-Natal | H04L 12/1813 715/753 |
| 2015/0085056 A1* | 3/2015 | Van Broeck | G06F 3/013 348/14.1 |

* cited by examiner

*Primary Examiner* — Stella L. Woo

(57) ABSTRACT

Methods and computer program product for signaling objects of participant gaze in a video conference in which a plurality of participants are displayed on respective screens. A first object of gaze is associated with one of the video participants based on a detected locus of gaze of the first participant relative to that participant's screen. The object of gaze is associated with a participation node of a second video participant on the basis of a display position of the second video participant on the screen of the first video participant. A participant-related gaze indicator links the first video participant to the second participant and is displayed at a display position of the first video participant's screen. Thus, each participant is apprised of other participants' attention. Additionally, a reciprocal gaze between a pair of participants may be indicated, where present.

4 Claims, 5 Drawing Sheets

RECIPROCAL SIGNALING OF PARTICIPANT GAZE IN MULTIPOINT VIDEO CONFERENCING

The present application claims the priority of U.S. Provisional Patent Application Ser. No. 63/054,740, filed Jul. 21, 2020, incorporated herein in its entirety.

TECHNICAL FIELD OF THE INVENTION

The present invention pertains to methods and apparatus for video conferencing communications, and, more particularly, to establishing virtual pairwise eye contact between concurrent participants in a multipoint video conference.

BACKGROUND OF THE INVENTION

Peer effects in small-group discourse, including both verbal and nonverbal interactions, have been the subject of much study over the years, and are known to impact group efficacy in achieving group goals, particularly in a pedagogical context. Discourse encompasses a broad range of interaction among participants especially when they are co-located, either in physical or virtual space, as in a video conference. Many aspects of discourse, including cadence and tone and non-verbal gesticulation and expression figure in how notions and feelings are transmitted, received and conveyed.

Adoption of video conferencing has become ubiquitous in commerce, public affairs, and among the general public, during the epoch of COVID-19. Video conferencing encompasses a myriad of modalities and platforms, with features geared variously to enterprise or casual applications. While some video conferencing applications primarily envision one group in communication with another, each group collocated in front of a single camera, other video applications cater to multiple participation nodes, each sharing video and/or audio input with other participation nodes in parallel. (The term "multipoint" shall apply, here, to either mode of video conferencing.) Each participant is located at an endpoint constituting a participation node of the video network. The aspects of the technology relevant to the present invention, discussed below, are agnostic with respect to physical implementation of the network, whether over the World Wide Web, or otherwise, and without regard to the protocols employed and standards implicated in establishing the video conference to which the present invention may be applied.

One modality is employed by Zoom™Video Communications, Inc. of San Jose, Calif., with pertinent technology described in many patents, including, for example, U.S. Pat. No. 10,348,454, and references cited therein, all incorporated herein by reference. Quoting the '454 patent, verbatim, FIG. 1, which depicts a networked computer system with which certain embodiments of the present invention may be implemented as well, is described as follows:

FIG. 1 illustrates a networked computer system with which an embodiment may be implemented. In one approach, a server computer 140 is coupled to a network 130, which is also coupled to client computers 100, 110, 120. For purposes of illustrating a clear example, FIG. 1 shows a limited number of elements, but in practical embodiments there may be any number of certain elements shown in FIG. 1. For example, the server 140 may represent an instance among a large plurality of instances of the application server in a data center, cloud computing environment, or other mass computing environment. There also may include thousands or millions of client computers.

In an embodiment, the server computer 140 hosts a video conferencing meeting and transmits and receives video, image, and audio data to and from each of the client computers 100, 110, 120.

Each of the client computers 100, 110, 120 comprises a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 100, 110, 120 may include an integrated or separate display unit such as a computer screen, TV screen or other display. Client computers 100, 110, 120 may comprise any of mobile or stationary computers including desktop computers, laptops, netbooks, ultra-books, tablet computers, smartphones, etc. Typically the GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In one embodiment, the network 130 is the Internet.

Each of the client computers 100, 110, 120 hosts, in an embodiment, an application that allows each of the client computers 100, 110, 120 to communicate with the server computer 140. In an embodiment, the server 140 may maintain a plurality of accounts, each associated with one of the client computers 100, 110, 120 and/or one or more users of the client computers.

In the discussions herein, each of the client computers 100, 110, 120 may be referred to as endpoints or as nodes of a network.

In prior art video conferencing, such as that of Zoom™, for example, other video participants may be displayed on the screen of a particular "user" (or, "participant") as images in a "gallery" mode, again, provided solely by way of example. Embodiments of the present invention are agnostic with respect to the order and format for displaying other participants, whether on the basis of an assigned rank that privileges a presenter, or on any other basis. Such a prior art display, as shown on the website of Zoom™, is depicted in FIG. 2.

A particular user, however, has no way to know where his/her image appears on the screens of the other users, and is, thus, unable to gauge whether anyone in particular, or anyone at all, is focused on the particular user, whether that particular user is speaking or silent.

U.S. Pat. No. 8,947,493, to Lian et al., entitled "System and Method for Alerting a Participant in a Video Conference," teaches the possibility for an active speaker in a video conference to identify a target participant with whom the active speaker wishes to communicate, and signal that intended target participant to the effect that the active speaker wishes to interact. Additionally, U.S. Pat. No. 8,717,406, to Garcia et al., entitled "Multi-participant audio/video communication with participant role indicator," again teaches the signaling of roles, where one of the participants is the "active" participant, i.e., the speaker. Both the Lian '493 patent and the Garcia '406 patent, together with the references cited therein, are incorporated herein by reference.

The prior art, however, does not contemplate that any participant in a video conference, whether active or passive, may advantageously wish to be apprised whether other participants gazing at the first participant's image, whether or not the gazer is, or intends to become, an active speaker. In fact, the prior art does not provide for any participant to know whether all eyes are upon that participant and that the participant has the attention of any particular participant. Such is an objective of the present invention, as described below.

SUMMARY OF THE INVENTION

In accordance with preferred embodiments of the present invention, a method is provided for signaling objects of participant gaze in a video conference in which a plurality of participants are displayed on each of a plurality of respective screens, each respective screen associated with a participation node. The method has steps of:
  a. associating with a first video participant a first object of gaze based on a detected locus of gaze relative to the respective screen of a first participation node associated with the first video participant;
  b. associating the first object of gaze of the first video participant with a participation node of a second video participant on the basis of a display position of the second video participant on the screen of the first video participant;
  c. generating a participant-related gaze indicator linking the first video participant to the second participant; and
  d. displaying the participant-related gaze indicator in association with a display position of the first video participant on the screen of the second video participant.

In further methods in accordance with the present invention, the participant-related gaze indicator may include a specified icon, and a differentiated background, and a frame surrounding display position of the first video participant on the screen of the second video participant.

In accordance with another aspect of the invention, a computer program product is provided for use on a computer system for signaling objects of participant gaze in a video conference in which a plurality of participants are displayed on respective screens, each respective screen associated with a participation node. The computer program product has a computer usable medium, and computer readable program code embodied in the medium has:
  a. program code for associating with a first video participant a first object of gaze based on a detected locus of gaze relative to the respective screen of a first participation node associated with the first video participant;
  b. program code for associating the first object of gaze of the first video participant with a participation node of a second video participant on the basis of a display position of the second video participant on the screen of the first video participant;
  c. program code for generating a participant-related gaze indicator linking the first video participant to the second participant; and
  d. program code for displaying the participant-related gaze indicator in association with a display position of the first video participant on the screen of the second video participant.

In further embodiments of the present invention, the computer program product also has program code for displaying a specified icon, a differentiated background, and a frame surrounding display position of the first video participant on the screen of the second video participant.

DESCRIPTION OF THE FIGURES

The foregoing features of the invention will be more readily understood by reference to the following detailed description, taken with reference to the accompanying drawings, in which.

DESCRIPTION OF SPECIFIC EMBODIMENTS OF THE INVENTION

Figure 2:
FIG. 2 is a depiction of a "gallery" mode provided, for example, by the prior art Zoom™video conferencing application.

Referring to FIG. 2, one practical problem advantageously addressed by embodiments of the present invention is the determination of the object of attention of each of the participants in a video conference and the apprisal of each person as to who is looking at them. This is an important component of small-group interaction and is absent in prior art implementations of video conferencing.

For purposes of further description of embodiments of the present invention, the following terms shall have the meaning indicated below, unless otherwise dictated by context.

The terms "video conference" shall refer, broadly, to any visual connection between two or more people who are not collocated within each other's physical line of sight, for the purpose of communication.

Insofar as a video conference is facilitated over a network of any sort, the node associated with each respective participant in the video conference may be referred to as a "participation node."

The term "gaze" shall refer to the physical direction to which a person's eyes are directed, as determined by an instrumental determination such as by using an eye tracker.

An "object of gaze" is a person depicted in an image to which a person's gaze is directed.

An "locus of gaze" refers to a position, relative to some fiducial reference, of an image appearing on a screen to which a person's gaze is directed.

The terms "screen" and "display" shall refer, broadly, to any monitor or other display device, serving for the viewing or projection of images of participants in a video conference.

The term "differentiated background" shall refer to a background, within a frame, that is readily distinguishable to the user relative to other frames on his/her screen.

The term "reciprocal gaze" refers to the occurrence of two persons looking at respective video images of each other.

Figure 1:
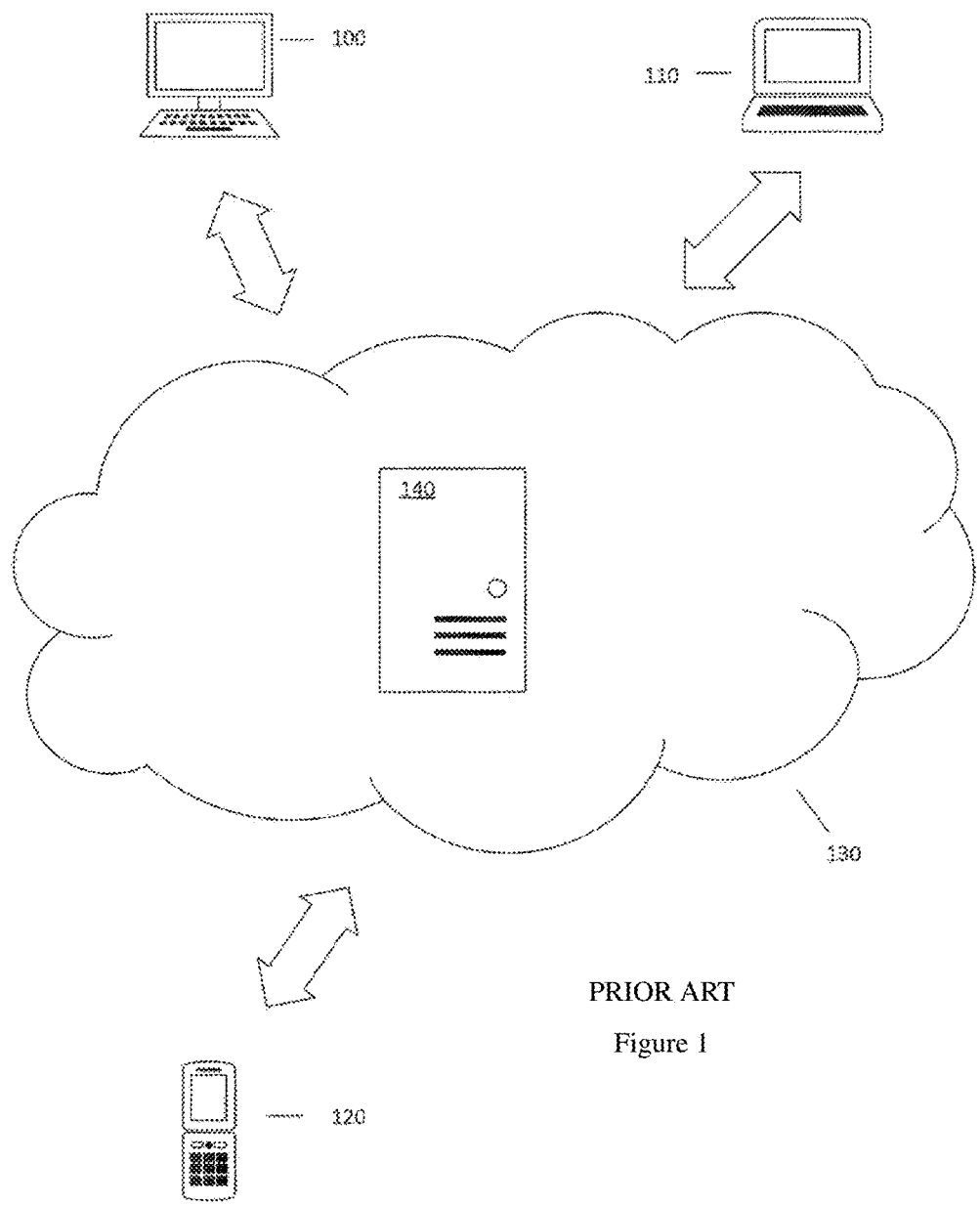
FIG. 1 illustrates a networked computer system with which an embodiment in accordance with the present invention may be implemented.
Figure 3:
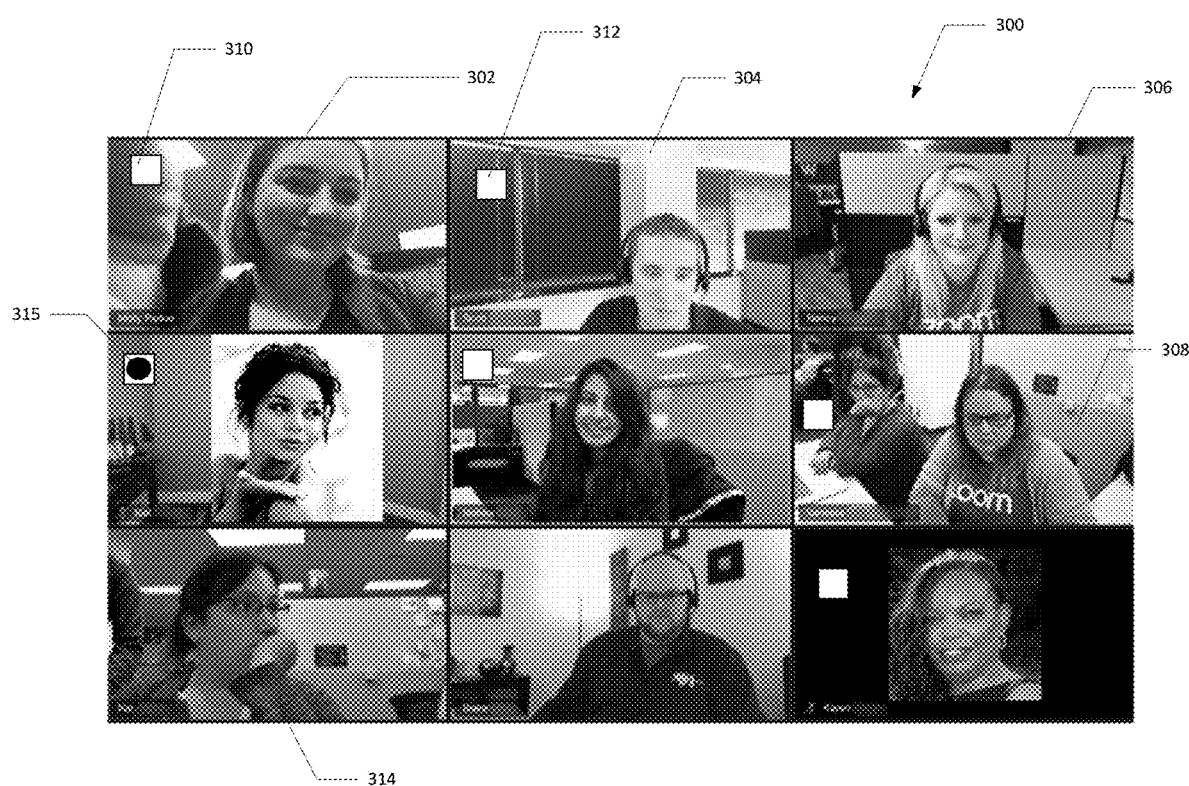
FIG. 3 is a depiction of a "gallery" mode in which a viewing participant is signaled that she is the object of participants' gazes in accordance with embodiments of the present invention.

Description of preferred embodiments of the present invention now continues with reference to FIG. 3. A display mode appearing on a screen (or "display"), designated generally by numerals 300 and 401 (the latter shown in FIG. 5) of a participant $a_1$ (shown in FIG. 5), such as in the video conferencing system, described above. Participant $a_1$ sees the other participants 302, 314 in distinct frames 304, 306 of her screen, each associated with a distinct node 100, 110, 120 (shown in FIG. 1) of the video conference or the network connecting them. A node may, in fact, encompass more than one participant, as shown, for example, in frame 308.

Figure 4:
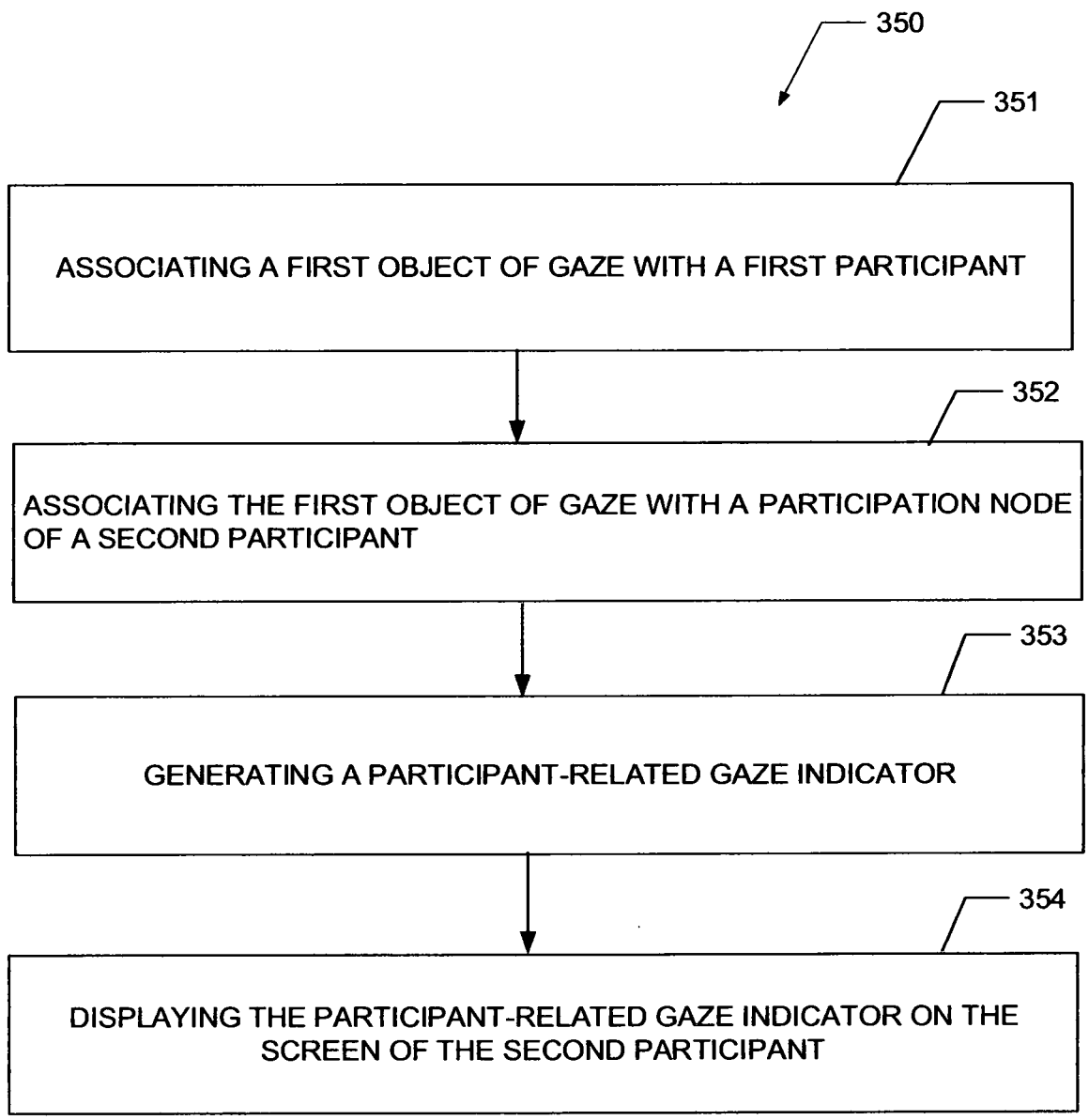
FIG. 4 is a flowchart depicting steps in signaling a participant that she is the object of another participant's gazes in accordance with embodiments of the present invention.
Figure 5:
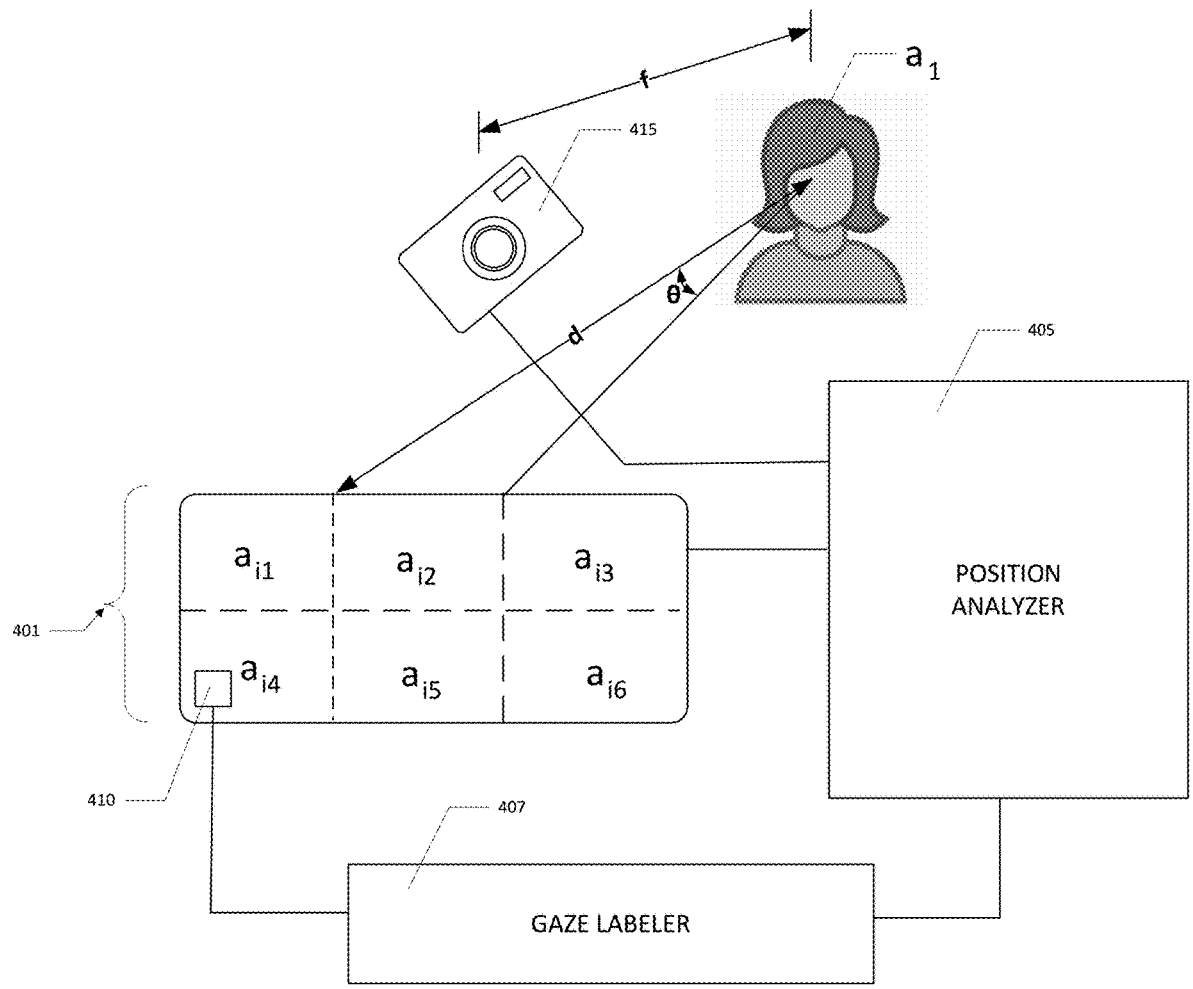
FIG. 5 is a schematic depiction of a system that may be employed for signaling a participant that she is the object of another participant's gaze in accordance with embodiments of the present invention.

Further description of preferred embodiments of the present invention now reference FIGS. 4 and 5. FIG. 4 shows a flowchart, designated generally by numeral 350, of steps in practicing one embodiment of the invention. In a first step, a first object of gaze is associated (in step 351) with a first participant, who, in the illustrated case is designated $a_1$. The other participants are similarly designated $a_i$, with the index i running from 1 to N, the total number of participants in the video conference. When first participant $a_1$ is looking at screen 401, the step 351) of associating her gaze with its object of the screen is performed by capturing the direction of her gaze, using any eye tracking technology, based on camera 415, with a focus corresponding to distance f from an eye of first participant $a_1$, or any other eye tracker. Eye tracking is reviewed, for example, in Kar and Corcoran, "*A review and analysis of eye-gaze estimation systems, algorithms and performance evaluation methods in consumer platforms,*" *IEEE Access*, vol. 5, pp. 16495-519, (2017) (hereinafter, "Kar 2017"), which is incorporated herein by reference.

Based on the position of her head relative to her screen 401, disposed at a distance d from an eye of first participant $a_1$, position analyzer 405 associates (in step 352) the object of her gaze with one of the frames 304, 306 on her screen, and, more particularly, with one of the participants in that frame, insofar as there may be more than one participant in a given frame. Eye tracking readily resolves on the order of a degree of gaze angle θ, for a resolution of approximately 1 cm on a screen 401 at a viewing distance of d≈60 cm from first participant $a_1$. Eye tracking may be performed, for example, using software supplied commercially by Tobii Pro AB of Stockholm, Sweden, or any other suitable eye tracking software. Calibration allows for translation of the detected angle of gaze of first participant $a_1$ to a zone on the screen 401 of that participant, and thus association with one of the frames 304, 306 on her screen. Calibration may be performed, for example, by instructing the viewer to identify two fiducial points on the screen prior to inception of the video conference, or using any other means.

The locus of gaze on each participant's screen (relative to a defined fiducial point on each screen) is encoded in a matrix $a_{i,j}$, where the i index runs over the participants who have screens, and the j index runs over the participants appearing on the screen of participant $a_i$. Thus, matrix $a_{i,j}$, which is stored in a memory (not shown) accessible to Position Analyzer 405, maps the virtual line of sight between all possible pairs of participants. Matrix $a_{i,j}$, may reside, for example, in a Multiple Control Unit (MCU) that is located at a node of the network 130 (shown in FIG. 1) which distributes the information contained therein to the connected client computers 100, 110, 120. Matrix $a_{i,j}$, may optionally be used at each local client computers 100, 110, 120 for ranking the display of other participants.

When Position Analyzer 405 identifies the gaze of participant a, as directed toward a locus on the screen of participant $a_i$ associated with another participant $a_k$, Gaze Labeler 407 generates (in step 353) a participant-related gaze indicator such as the white squares 310, 312, shown in FIG. 3, and the square 405 shown in FIG. 4. White squares are depicted by way of example only, and any specified indicator of participant gaze may be used within the scope of the present invention, such as surrounding the display associated with a participant by a frame, to give another example. The gaze indicator may be an "eye" icon, or any other icon, to cite other examples. Or the gaze indicator may consist of a differentiated brightness or background behind the image of a participant who is gazing at the participant $a_i$ who is viewing a particular screen 401. All indications of gaze are within the scope of the present invention as claimed. The participant-related gaze indicator is directed, by suitable encoding, to be implemented solely on the screen of the affected participant, the one to whom gaze is directed. The participant-related gaze indicator is then displayed (in step 354) on the screen of the participant who is the object of a gaze by one or more other participants.

In cases where a reciprocal gaze between participant $a_i$ and participant $a_k$ is identified by Position Analyzer 405, a reciprocal gaze is indicated in the screens of both participants, by means of a symbol identifying that relationship, such as the square with an inscribed circle 315 shown in FIG. 3. Again, the particular symbol used to represent a reciprocal gaze is depicted by way of example only, and any indicator of reciprocal participant gaze may be used within the scope of the present invention. Signaling reciprocal participant gaze may be referred to herein as virtual pairwise eye contact.

Other Embodiments

The present invention may be embodied in any number of instrument modalities. In particular, the information derived from other techniques may be used to complement the data derived as taught above. In alternative embodiments, the disclosed methods for signaling objects of participant gaze in a video conference may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product). These and other variations and modifications are within the scope of the present invention as defined in any appended claims.

What is claimed is:

1. A method for signaling objects of participant gaze in a video conference in which a plurality of participants are displayed on each of a plurality of respective screens, each respective screen associated with a participation node, the method comprising:
   a. associating with a first video participant a first object of gaze based on a detected locus of gaze relative to the respective screen of a first participation node associated with the first video participant;
   b. associating the first object of gaze of the first video participant with a participation node of a second video participant on the basis of a display position of the second video participant on the screen of the first video participant;
   c. encoding a virtual line of sight among successive pairs of participants of the plurality of participants into a matrix; and
   d. using the matrix at each of the participation nodes to locally indicate to each of the plurality of participants the object of gaze of at least one of the plurality of participants.

2. A method in accordance with claim 1, wherein the participant-related gaze indicator includes a further signal indicative of a reciprocal gaze of the first and second participants toward each other.

3. A computer program storage product for use on a computer system for signaling objects of participant gaze in a video conference in which a plurality of participants are displayed on respective screens, each respective screen associated with a participation node, the computer program storage product comprising a tangible computer usable medium having computer readable program code thereon, the computer readable program code including:
   a. program code for associating with a first video participant a first object of gaze based on a detected locus of gaze relative to the respective screen of a first participation node associated with the first video participant;
   b. program code for associating the first object of gaze of the first video participant with a participation node of a second video participant on the basis of a display position of the second video participant on the screen of the first video participant;
   c. program code for encoding a virtual line of sight among successive pairs of participants of the plurality of participants into a matrix; and
   d. program code for using the matrix at each of the participation nodes to locally indicate to each of the plurality of participants the object of gaze of at least one of the plurality of participants.

4. A computer program storage product in accordance with claim 3, further comprising program code for displaying a signal indicative of a reciprocal gaze of the first and second participants toward each other.

* * * * *